United States Patent [19]

Nakanishi et al.

[11] 3,723,476
[45] Mar. 27, 1973

[54] 1-HYDROCARBYLAMINO-3-(ORTHO-FURYLMETHYLOXYPHENOXY OR TETRAHYDROFURYLMETHYLOXY-PHENOXY)-2-PROPANOL COMPOUNDS

[75] Inventors: Michio Nakanishi; Tomio Muro, both of Oita; Hiroshi Imamura, Chiba; Nobuharu Yamaguchi, Kanagawa, all of Japan

[73] Assignee: Yoshitomi Pharmaceutical Industries, Ltd., Osaka, Japan

[22] Filed: May 15, 1970

[21] Appl. No.: 37,895

[30] Foreign Application Priority Data

| May 16, 1969 | Japan | 44/38137 |
| Apr. 3, 1970 | Japan | 45/28945 |
| Apr. 3, 1970 | Japan | 45/28946 |
| Oct. 2, 1969 | Japan | 44/79477 |

[52] U.S. Cl. ............260/347.7, 260/247.1, 260/247, 260/268 FT, 260/268 R, 260/293.68, 260/293.73, 260/293.83, 260/296, 260/332.3, 260/570, 424/251, 424/248, 424/263, 424/267, 424/275, 424/285, 424/325

[51] Int. Cl. .............................C07d 5/16, C07d 5/20
[58] Field of Search...................................260/347.7

[56] References Cited

UNITED STATES PATENTS 3,203,992    8/1965    Kunz et al.........................260/287 X

*Primary Examiner*—Alex Mazel
*Assistant Examiner*—Bernard Dentz
*Attorney*—Sughrue, Rothwell, Mion, Zinn and Macpeak

[57] ABSTRACT

Phenoxy-aminopropanol derivatives of the formula

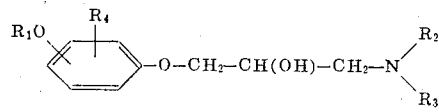

wherein $R_1$ is furylmethyl, thienylmethyl, tetrahydrofurylmethyl, pyridylmethyl, or a group of the formula $R-X-A-$, wherein R is $C_{1-4}$ alkyl, $C_{1-4}$ alkenyl, phenyl or benzyl, X is $-O-$ or $-S-$, and A is $C_{1-4}$ alkylene or $-CH_2C\equiv CCH_2-$; $-N(R_2)(R_3)$ is $C_{1-4}$ alkylamino, dialkylamino (each alkyl being at most four carbon atoms), cyclohexylamino, piperidino, morpholino or 4-methyl-1-piperazinyl; and $R_4$ is H, $CH_3$ or Cl, and pharmaceutically acceptable acid addition salts thereof, are useful as β-adrenergic blocking agents.

10 Claims, No Drawings

1-HYDROCARBYLAMINO-3-(ORTHO-FURYLMETHYLOXYPHENOXY OR TETRAHYDROFURYLMETHYLOXY-PHENOXY)-2-PROPANOL COMPOUNDS

FIELD OF THE INVENTION

This invention relates to novel and therapeutically valuable phenoxy-aminopropanol derivatives.

SUMMARY OF THE INVENTION

The novel phenoxy-aminopropanol derivatives of this invention are compounds in accordance with the formula

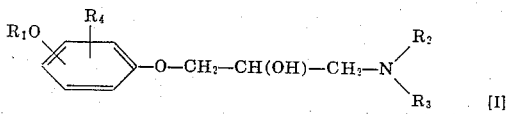

and pharmaceutically acceptable acid addition salts thereof, where $R_1$ is furylmethyl, thienylmethyl, tetrahydrofurylmethyl, pyridylmethy or a group of the formula $R-X-A-$, wherein R is alkyl, alkenyl, phenyl or benzyl (the alkyl or alkenyl group having, at most, four carbon atoms and including such groups as methyl, ethyl, propyl, isopropyl, butyl or allyl), X is $-O-$ or $-S-$, and A is alkylene (the alkylene group having, at most, four carbon atoms and including such groups as methylene, ethylene, propylene, trimethylene or tetramethylene) or $-CH_2C \equiv CCH_2-$; $-N(R_2)(R_3)$ is alkyl- or dialkylamino (the alkyl group having, at most, four carbon atoms and including such groups as methyl, ethyl, propyl, isopropyl, butyl, sec-butyl or tert-butyl), cyclohexylamino, piperidino, morpholino or 4-methyl-1-piperazinyl; and $R_4$ is H, $CH_3$ or Cl. The compounds of this invention are useful as $\beta$-adrenergic blocking agents.

DETAILED DESCRIPTION OF THE PREFERRED EMBODIMENTS

The compounds of formula [I] may be produced by reacting a compound of the formula

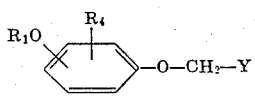

with a compound of the formula

wherein $R_1$, $R_2$, $R_3$ and $R_4$ have the same meaning as above, and Y is a group of the formula

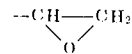

or $-CH(OH)-CH_2-$(halogen).

The reaction is usually carried out in an inert solvent such as methanol, ethanol, propanol, isopropanol, ether, dioxane, tetrahydrofuran, benzene, toluene, xylene, water, dimethylformamide, dimethylsulfoxide or the like (preferably methanol or ethanol), at from room temperature (20°–30°C) to the boiling point of the solvent employed for from several hours to several days.

When a compound of formula II, wherein Y is $-CH(OH)-CH_2-$(halogen), is used as a starting material, the reaction may be carried out in the presence of an acid acceptor such as potassium carbonate, sodium carbonate, sodium hydroxide, triethylamine or pyridine.

The compounds of formula I can be converted in the conventional manner into the corresponding acid addition salts by treatment with various inorganic and organic acids, for example, hydrochloric, hydrobromic, sulfuric, phosphoric, oxalic, fumaric, maleic, tartaric, citric, malonic and o-(p-hydroxybenzoyl)benzoic acid, phenolphthalin and the like.

Starting compounds II wherein Y is epoxyethyl may be produced, for example, by reacting a compound of the formula

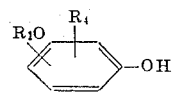

with epichlorhydrin in water in the presence of sodium hydroxide or potassium hydroxide.

A specific example of the preparation of the starting compound II is as follows:

Nine grams of o-(2-methoxyethoxy)phenol is suspended in 50 milliliters of water containing 3.7 grams of potassium hydroxide, and 5.5 grams of epichlorhydrin is added thereto with stirring. The mixture is stirred at room temperature for 7 hours, and then extracted with two 50 milliliter portions of benzene. The extract is washed with water, dried over anhydrous magnesium sulfate and the benzene is distilled off to give 8.5 grams of oily 1-(2,3-epoxypropoxy)-2-(2-methoxyethoxy)benzene showing $n_D^{20}=1.5257$.

A starting compound of formula II, wherein $R_4$ is $CH_3$ or Cl, may be prepared, for example, from a substituted catechol of the formula:

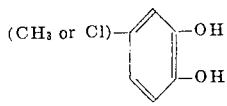

[V]

Therefore, the compound IV is usually obtained in the form of a mixture consisting of the following isomers:

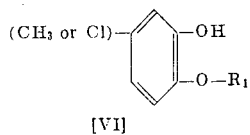 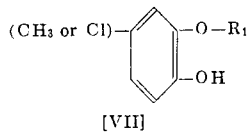

[VI]         [VII]

In this case, the compound I is obtained in the form of a mixture of the corresponding isomers VI and VII.

The compounds of formula I and their pharmaceutically acceptable acid addition salts have strong β-adrenergic blocking activity as shown, for example, by the following tests.

The test for β-adrenergic activity which is judged from the antagonistic activity of the test compound against isoproterenol is carried out by the following procedures:

1. A tracheal chain preparation, which is prepared from the tracheal muscle of a guinea pig according to the method described by K. Takagi et al in "Chemical and Pharmaceutical Bulletin", Vol. 6, 716–720 (1958), is suspended in a 20 ml organ bath containing Tyrode solution, said bath being maintained at 37°C. After contraction is obtained with $10^{-5}$ g/ml of acetylcholine chloride, isoproterenol is added cumulatively. Antagonistic intensity of the test compound against the expansion of the tissue induced with the addition of isoproterenol is measured according to the method described by J.M. van Rossum et al in "Archives Internationales de Pharmacodynamie et de Therapie", Vol. 143, 299–330 (1963).

2. An auricular preparation of guinea pig, obtained by a conventional manner, is suspended in a 20 ml organ bath containing Tyrode solution oxygenated with 95% $O_2$ and 5% $CO_2$, said bath being maintained at 32°C. Antagonistic activity of the test compound against the increase of contraction force and heart beat number induced with the addition of $10^{-9}$ g/ml of isoproterenol is measured. This test is performed essentially in accordance with the method described by P.M. Lish et al in "Journal of Pharmacology and Experimental Therapeutics", Vol. 149, 161–173 (1965).

The results of these tests are set forth in the following table, wherein $pA_2$ is the negative of the logarithm to the base 10, of the molar concentration of the test compound which reduces the effect of twice the dose of isoproterenol on the contracting action of the guinea pig tracheal muscle to that of a single dose; $IC_{50}$ is the concentration of the test compound which inhibits 50 percent of the effect of isoproterenol.

Antagonistic activity against isoproterenol

| Test Compound | Tracheal chain preparation | | Auricular preparation |
|---|---|---|---|
| | | Contraction force | Heart beat number |
| | $pA_2$ | $IC_{50}$ μg/ml | $IC_{50}$ μg/ml |
| A | 8.2 | 0.1 | 0.1 |
| B | 8.3 | 0.03 | 0.03 |
| C | 8.8 | 0.03 | 0.03 |
| D | 7.3 | 0.5 | 0.5 |
| E | 6.4 | 0.5–1.0 | 0.1–1.0 |
| F | 8.5 | 0.03 | 0.03 |
| G | 7.5 | 0.3 | 0.3 |
| H | 7.8 | 0.1 | 0.1 |
| J | 7.9 | 0.2 | 0.3 |
| K | 8.4 | 0.1 | 0.1 |
| N | 8.3 | 0.01–0.03 | 0.01–0.03 |

In the above table, the compounds designated by letters are as follows: (other exemplary compounds are given)

A: 1-isopropylamino-3-[o-(2-methoxyethoxy)phenoxy]-2-propanol maleate

B: 1-isopropylamino-3-(o-methoxymethoxyphenoxy)-2-propanol fumarate

C: 1-tert-butylamino3-(o-methoxymethoxyphenoxy)-2-propanol ½ fumarate

D: 1-isopropylamino-3-[o-(2-ethoxyethoxy)phenoxy]-2-propanol ½ fumarate ½ hydrate E: 1-isopropylamino-3-(p-methoxymethoxyphenoxy)-2-propanol fumarate F: 1-tert-butylamino-3-[o-(2-methoxyethoxy)phenoxy]-2-propanol ½ fumarate ½ hydrate G: 1-cyclohexylamino-3-(o-isopropoxymethoxyphenoxy)-2-propanol ½ fumarate H: 1-isopropylamino-3-[o-(2-methoxy-1-methylethyl)phenoxy]-2-propanol fumarate J: 1-sec-butylamino-3-[o-(2-methoxyethoxy)phenoxy]-2-propanol fumarate K: 1-sec-butylamino-3-(o-methoxymethoxyphenoxy)-2-propanol ½ fumarate L: 1-tert-butylamino-3-(o-ethoxymethoxyphenoxy)-2-propanol ½ fumarate M: 1-tert-butylamino-3-(o-allyloxymethoxyphenoxy)-2-propanol ½ fumarate N: 1-isopropylamino-3-[o-(2-thienylmethoxy)phenoxy]-2-propanol ½ fumarate O: 1-tert-butylamino-3-[o-(2-thienylmethoxy)phenoxy]-2-propanol ½ fumarate monohydrate P: 1-isopropylamino-3-(o-tetrahydrofurfuryloxyphenoxy)-2-propanol ½ fumarate ½ hydrate Q: 1-(4-methyl-1-piperazinyl)-3-[o-(2-thienylmethoxy)phenoxy]-2-propanol ½ fumarate ½ hydrate R: 1-piperidino-3-[o-(2-thienylmethoxy)phenoxy]-2-propanol fumarate S: 1-isopropylamino-3-(o-furfuryloxyphenoxy)-2-propanol ½ fumarate T: 1-tert-butylamino-3-(o-furfuryloxyphenoxy)-2-propanol ½ fumarate ½ hydrate U: 1-tert-butylamino-3-(o-tetrahydrofurfuryloxyphenoxy)-2-propanol ½ fumarate V: 1-tert-butylamino-3-[o-(2-methylthioethoxy)phenoxy]-2-propanol ½ fumarate W: 1-tert-butylamino-3-[o-(3-pyridylmethoxy)phenoxy]-2-propanol fumarate ½ hydrate Suitable results may also be obtained with the above compounds not specifically listed in the previous Table (i.e., L, M and O–W).

Acute toxicities of Compound I when administered intraperitoneally and/or intravenously to mice are as follows:

| Compound | LD$_{50}$ mg/kg Intraperitoneally | Intravenously |
|---|---|---|
| B | 375 | 100-150 |
| C | 160-320 | 150 |
| L |  | 65.6 |
| N | 175 |  |
| O |  | 37.5 |
| P |  | 37.5 |
| T |  | 75.0 |
| V |  | 37.5 |
| W |  | 75.0 |

In view of various tests including those mentioned above, the compounds of the present invention represented by formula I and pharmaceutically acceptable acid addition salts thereof can be administered safely as β-adrenergic blocking agents for the treatment of angina pectoris, various arrhythmias such as cardiac, continuous, inotropic, juvenile, nodal, perpetual, phasic sinus, respiratory, sinus and vagal arrhythmia, pheochromocytoma and the like, in the form of a pharmaceutical preparation with a suitable and conventional carrier or adjuvant, administrable orally or by way of injection, without harm to the host.

The pharmaceutical preparations may take any conventional form such as tablets, capsules, granules, powders, syrups, injectable solutions, etc.

The following are illustrative examples of formulations to be administered when the compounds of formula I and their acid addition salts are administered for the above pharmaceutical purposes.

a. 10 mg. tablets are prepared from the following composition:

| Compound C | 12.0 mg. (equivalent to 10 mg. of the base) |
|---|---|
| lactose | 80.0 mg. |
| starch | 27.0 mg. |
| magnesium stearate | 1.0 mg. | b. 10 mg. capsules are prepared from the following composition:

| Compound C | 12.0 mg. |
|---|---|
| lactose | 70.0 mg. |
| starch | 17.0 mg. |
| magnesium stearate | 1.0 mg. | c. a 0.1 percent injectable solution is prepared by combining the following:

| Compound C | 6.0 mg. |
|---|---|
| sodium chloride | 54.0 mg. |
| water for injection | a sufficient quantity to make 5 milliliters |

The oral daily dose of the compounds of formula I or a salt thereof for huma adults usually ranges from about 30 to 60 milligrams.

In the following illustrative examples of typical and presently preferred embodiments of the invention, "g." and "ml." represent "gram(s)" and "milliliter(s)", respectively.

EXAMPLE 1

To a solution of 8.0 g. of 1-(2,3-epoxypropoxy)-2-(2-methoxyethoxy)-benzene in 60 ml. of methanol are added 3.5 g. of isopropylamine and 0.7 ml. of water, the mixture is allowed to stand at 25°–30°C for 72 hours, and then the methanol is distilled off. The residue is dissolved in 5 percent hydrochloric acid and the solution is extracted with two 50 ml. portions of benzene. The aqueous layer is made alkaline with potassium hydroxide and the isolated oil is extracted with benzene. The extract is dried over potassium carbonate and concentrated to give 8.1 g. (80 percent) of 1-isopropylamino-3-[o-(2-methoxyethoxy)phenoxy]-2-propanol melting at 63°–65°C.

To an ether solution containing 0.28 g. of the product mentioned above is added dropwise a solution of 0.12 g. of maleic acid in 5 ml. of acetone. The precipitated crystals are collected by filtration and recrystallized from a mixture of ethanol and ether to give 0.32 g. of the corresponding acid maleate melting at 51°–54°C.

EXAMPLE 2

To a solution of 5.5 g. of 1-bromo-3-(o-methoxymethoxyphenoxy)-2-propanol in 50 ml. of ethanol is added 3.6 g. of piperidine, the mixture is refluxed for 6 hours, and then the ethanol is distilled off. The residue is dissolved in 5 percent oxalic acid and extracted with benzene. The aqueous layer is made alkaline with potassium hydroxide, the isolated oil is extracted with benzene, the benzene layer is dried over potassium carbonate, and then the benzene distilled off to give 4.6 g. of oily 1-piperidino-3-(o-methoxymethoxyphenoxy)-2-propanol. Its boiling point is 170°–175°C/0.1 mmHg.

The corresponding acid fumarate recrystallized from a mixture of ethanol and ether melts at 127°–128°C.

EXAMPLE 3

To a solution of 1.0 g. of 1-(2,3-epoxypropoxy)-2-(2-thienylmethoxy)benzene in 15 ml. of methanol are added 1.0 g. of isopropylamine and one drop of water, the mixture is allowed to stand at 25°–30°C for 72 hours, and then the methanol is distilled off. The residue is dissolved in 50 ml. of benzene and extracted with two 50 ml. portions of 7 percent oxalic acid. The aqueous layer is made alkaline with potassium hydroxide, and the isolated oil is extracted with benzene. The benzene layer is dried over potassium carbonate and concentrated to give 10 g. of oily 1-isopropylamino-3-[o-(1-thienylmethoxy)phenoxy]-2-propanol.

The corresponding fumarate recrystallized from a mixture of methanol and ether melts at 179°–182°C.

EXAMPLE 4

To a solution of 3.0 g. of 1-chloro-3-[o-(2-thienylmethoxy)phenoxy]-2-propanol in 30 ml. of ethanol is added 1.9 g. of piperidine, the mixture is refluxed for 10 hours, and then the ethanol is distilled off. The residue is dissolved in ether and the insoluble matter is filtered off. The ether solution is extracted with 70 ml. of 7 percent oxalic acid. The aqueous layer is made alkaline with potassium hydroxide and the isolated oil is extracted twice with ether. The ether extract is dried over potassium carbonate and concentrated to give 2.9 g. (83 percent) of oily 1-piperidino-3-[o-(2-thienylmethoxy) phenoxy]-2-propanol.

The corresponding acid fumarate recrystallized from a mixture of methanol and ether melts at 148°–149°C.

EXAMPLE 5

To a solution of 2.4 g. of 1-(2,3-epoxypropoxy)-2-(2-methylthioethoxy)benzene in 15 ml. of methanol are added 1.5 g. of tert-butylamine and 0.1 ml. of water, the mixture is allowed to stand at 25°-30°C for 72 hours, and then the methanol is distilled off. The residue is dissolved in toluene and the solution is extracted twice with 5 percent oxalic acid. The aqueous extract is made alkaline with potassium hydroxide and the isolated oil is extracted with toluene. The toluene extract is dried over potassium carbonate and concentrated to give 2.5 g. (80percent) of 1-tert-butylamino-3-[o-(2-methylthioethoxy)phenoxy]-2propanol melting at 45°-46°C.

The corresponding fumarate recrystallized from a mixture of ethanol and ether melts at 138°-140°C.

EXAMPLE 6

To a solution of 3.2 g. of 1-bromo-3-[o-(2-methylthioethoxy)phenoxy]-2-propanol in 30 ml. of ethanol is added 1.8 g. of piperidine, the mixture is refluxed for 6 hours, and then the ethanol is distilled off. The residue is dissolved in benzene and the solution is extracted twice with 5 percent oxalic acid. The aqueous extract is made alkaline with potassium hydroxide and the isolated oil is extracted with benzene. The benzene extract is dried over potassium carbonate and the benzene is distilled off to give 2.7 g. of oily 1-piperidino-3-[o-(2methylthioethoxy)phenoxy]-2-propanol.

The corresponding acid fumarate recrystallized from a mixture of methyl ethyl ketone and ether melts at 103°-106°C.

EXAMPLE 7

To a solution of 4.5 g. of an almost equimolar mixture of 1-(2,3-epoxypropoxy)-2-methoxymethoxy-4-methylbenzene and 1-(2,3-epoxypropoxy)-2-methoxymethoxy-5-methylbenzene in 45 ml. of methanol are added 1.5 g. of isopropylamine and 0.2 ml. of water, the mixture is allowed to stand at 25°-30°C for 72 hours, and then the methanol is distilled off. The residue is dissolved in benzene and the solution is extracted with two 70 ml. portions of 5 percent oxalic acid. The aqueous extract is made alkaline with potassium hydroxide and the isolated oil is extracted with benzene. The benzene extract is dried over potassium carbonate and concentrated to give 4.5 g. 80 percent) of an oily, almost equimolar mixture of 1-isopropylamino-3-(2-methoxymethoxy-4-methylphenoxy)-2-propanol and 1-isopropylamino-3-(2-methoxymethoxy-5-methylphenoxy)-2-propanol.

The corresponding fumarate mixture recrystallized from a mixture of ethanol and ether melts at 125°-127°C.

EXAMPLE 8

To a solution of 3.1 g. of an almost equimolar mixture of 1-bromo-3-(2-methoxymethoxy-4-methylphenoxy)-2-propanol and 1-bromo-3-(2methoxymethoxy-5-methylphenoxy)-2-propanol in 35 ml. of ethanol is added 2.0 g. of piperidine, the mixture is refluxed for 6 hours, and then the ethanol is distilled off. The residue is dissolved in 70 ml. of 5 percent oxalic acid and the insoluble matter is extracted with benzene. The aqueous layer is made alkaline with potassium hydroxide and the isolated oil is extracted with benzene. The benzene extract is dried over potassium carbonate and the benzene is distilled off to give 2.5 g. of an oily, almost equimolar mixture of 1-piperidino-3-(2-methoxymethoxy-4-methylphenoxy)-2-propanol and 1-piperidino-3-(2-methoxymethoxy-5-methylphenoxy)-2-propanol boiling at 180°-185°C/0.1 mmHg.

Proceeding by the method of the above Examples, but substituting equivalent amounts of appropriate starting materials, the following compounds are also produced:

1. 1-(4-methyl-1-piperazinyl)-3-(o-methoxymethoxyphenoxy)-2-propanol dioxalate melting at 187°-189°C with decomposition;
2. 1-morpholino-3-(o-methoxymethoxyphenoxy)-2-propanol boiling at 155°-160°C/0.07 mmHg and its fumarate melting at 85°-86°C;
3. 1-tert-butylamino-3-(o-methoxymethoxyphenoxy)-2-propanol ½ fumarate melting at 162°-163°C with decomposition;
4. 1-isopropylamino-3-(p-methoxymethoxyphenoxy)-2-propanol melting at 45°-48°C and its fumarate melting at 95°-98°C;
5. 1-isopropylamino-3-(m-methoxymethoxyphenoxy)-2-propanol boiling at 135°-142°C/0.1 mmHg and melting at 25°-30°C;
6. 1-piperidino-3-(m-methoxymethoxyphenoxy)-2-propanol boiling at 140°-148°C/0.05 mmHg;
7. 1-piperidino-3-[o-(2-methoxyethoxy)phenoxy]-2-propanol fumarate melting at 148°-151°C;
8. 1-morpholino-3-[o-(2methoxyethoxy)phenoxy]-2-propanol boiling at 142°-148°C/0.05 mmHg;
9. 1-isopropylamino-3-(o-methoxymethoxyphenoxy)-2-propanol ½ fumarate melting at 145°-146°C with decomposition;
10. 1-isopropylamino-3-(o-isopropoxymethoxyphenoxy)-2-propanol boiling at 140°-143°C/0.08 mmHg;
11. 1-isopropylamino-3-[o-(4methoxybutynyloxy)phenoxy]-2-propanol ½ fumarate ½ hydrate melting at 89°-93°C;
12. 1-isopropylamino-3-[o-(2-ethoxyethoxy)phenoxy]-2-propanol ½ fumarate ½ hydrate melting at 104°-107°C;
13. 1-isopropylamino-3-[o-(2-methoxy-1-methylethoxy)phenoxy]-2-propanol fumarate melting at 108°-112°C;
14. 1-cyclohexylamino-3-(o-isopropoxymethoxyphenoxy)-2-propanol ½ fumarate melting at 115°-117°C;
15. 1-sec-butylamino-3-[o-(2-methoxyethoxy)phenoxy]-2-propanol ½ fumarate melting at 85°-88°C;
16. 1-sec-butylamino-3-(o-methoxymethoxyphenoxy)-2-propanol ½ fumarate melting at 125°-127°C;
17. 1tert-butylamino-3-(o-ethoxymethoxyphenoxy)-2-propanol ½ fumarate melting at 168°-171°C;
18. 1tert-butylamino-3-(o-allyloxymethoxyphenoxy)-2-propanol ½ fumarate melting at 161°-162°C;
19. 1-piperidino-3-(o-allyloxymethoxyphenoxy)-2-propanol ½ fumarate melting at 120°-122°C;

20. 1-(4-methyl-1-piperazinyl)-3-[o-(2-thienyl-methoxy)phenoxy]-2-propanol di)acid fumarate) melting at 158°–161°C;
21. 1-tert-butylamino-3-[o-(2-thienylmethoxy)phenoxy]-2-propanol melting at 142°–146°C;
22. 1-dimethylamino-3-[o-(2-thienylmethoxy)phenoxy]-2-propanol oxalate melting at 88°–90°C;
23. 1-isopropylamino-3-(o-furfuryloxyphenoxy)-2-propanol fumarate melting at 164°–166°C;
24. 1-tert-butylamino-3-(o-furfuryloxyphenoxy-2-propanol fumarate ½ hydrate melting at 142°–144°C;
25. 1-morpholino-3-(o-furfurloxyphenoxy)-2-propanol acid fumarate melting at 138°–142°C;
26. 1-cyclohexylamino-3-(o-furfuryloxyphenoxy)-2-propanol melting at 119°–122°C;
27. 1-isopropylamino-3-(o-tetrahydrofurfuryloxyphenoxy)-2-propanol fumarate melting at 135°–137°C;
28. 1-tert-butylamino-3-(o-tetrahydrofurfuryloxyphenoxy)-2-propanol ½ fumarate melting at 128°–132°C;
29. 1-tert-butylamino-3-[o-(3-pyridylmethoxy)phenoxy]-2-propanol fumarate ½ hydrate melting at 142°–146°C;
30. 1-cyclohexylamino-3-[o-(3-pyridylmethoxy)phenoxy]-2-propanol fumarate melting at 138°–141°C;
31. 1tert-butylamino-3-[o-(2-phenoxyethoxy)phenoxy]-2-propanol fumarate melting at 152°–153°C;
32. 1-tert-butylamino-3-(o-benzyloxymethoxyphenoxy)-2-propanol fumarate melting at 154°–156°C;
33. 1tert-butylamino-3-(o-methylthiomethoxyphenoxy)-2-propanol fumarate melting at 163°–165.5°;
34. 1-(4-methyl-1-piperazinyl)-3-[o-(2-methylthioethoxy)phenoxy]-2-propanol dioxalate melting at 202°–203°C with decomposition;
35. 1-morpholino-3-[o-(2-methylthioethoxy)phenoxy]-2-propanol acid fumarate melting at 130°–133°C;
36. 1-cyclohexylamino-3-[o-(2-methylthioethoxy)phenoxy]-2-propanol melting at 90°–93°C;
37. Almost equimolar mixture of 1-(4-methyl-1-piperazinyl)-3-(2-methoxymethoxy)-4-methylphenoxy)-2-propanol and 1-(4-methyl-1-piperazinyl)-3-(2-methoxymethoxy-5-methylphenoxy)-2-propanol, its dioxalate mixture melting at 187°–188°C;
38. Almost equimolar mixture of 1-tert-butylamino-3-(2-methoxymethoxy-4-chlorophenoxy)-2-propanol and 1-tert-butylamino-3-(2-methoxymethoxy-5-chlorophenoxy)-2-propanol, its fumarate mixture melting at 136°–139°C; and
39. Almost equimolar mixture of 1-morpholino-3-(2-methoxymethoxy-4-methyl-phenaxy)-2-propanol and 1-morpholino-3-(2-methoxymethoxy-5-methylphenoxy)-2-propanol boiling at 190°–195°C/0.3 mmHg.

What is claimed is:

1. A compound selected from the group consisting of phenoxyaminopropanol derivatives of the formula:

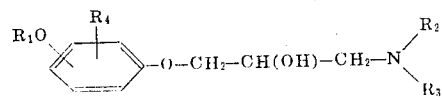

wherein $R_1$ is a member selected from the group consisting of a furylmethyl group and a tetrahydrofurylmethyl group; $-N(R_2)(R_3)$ is a member selected from the group consisting of an alkyl- or dialkylamino group, the alkyl group of which has, at most, four carbon atoms, and a cyclohexylamino group; and $R_4$ is a member selected from the group consisting of a hydrogen atom, a methyl group, and a chlorine atom, as well as the pharmaceutically acceptable acid addition salts thereof.

2. The compound of claim 1:
   1-isopropylamino-3-(o-furfuryloxyphenoxy)-2-propanol fumarate.
3. The compound of claim 1:
   1-tert-butylamino-3-(o-furfuryloxyphenoxy)-2-propanol fumarate ½ hydrate.
4. The compound of claim 1:
   1-cyclohexylamino-3-(o-furfuryl-oxyphenoxy)-2-propanol.
5. The compound of claim 1:
   1-isopropylamino-3-(o-tetrahydrofurfuryloxyphenoxy)-2-propanol fumarate.
6. The compound of claim 1:
   1-tert-butylamino-3-(o-tetrahydrofurfuryloxyphenoxy)-2-propanol ½ fumarate.
7. A compound of claim 1 having the name 1-isopropylamino-3-(o-tetrahydrofurfuryloxyphenoxy)-2-propanol.
8. A compound of claim 1 having the name 1-isopropylamino-3-(o-furfuryloxyphenoxy)-2-propanol.
9. A compound of claim 1 having the name 1-tert-butylamino-3-(o-furfuryloxyphenoxy)-2-propanol.
10. A compound of claim 1 having the name 1-tert-butylamino-3-(o-tetrahydrofurfuryloxyphenoxy)-2-propanol.

* * * * *